United States Patent
Baentsch et al.

(10) Patent No.: US 8,302,173 B2
(45) Date of Patent: Oct. 30, 2012

(54) PROVIDING A USER DEVICE WITH A SET OF ACCESS CODES

(75) Inventors: Michael Baentsch, Gross (CH); Peter Buhler, Horgen (CH); Thomas Eirich, Waedenswil (CH); Frank Hoering, Zurich (CH); Thorsten Kramp, Kilchberg (CH); Marcus Oestreicher, Zurich (CH); Michael Osborne, Au (CH); Thomas D. Weigold, Thalwil (CH)

(73) Assignee: International Business Machines Corporation, Armonk, NY (US)

(*) Notice: Subject to any disclaimer, the term of this patent is extended or adjusted under 35 U.S.C. 154(b) by 358 days.

(21) Appl. No.: 12/125,247

(22) Filed: May 22, 2008

(65) Prior Publication Data
US 2008/0226076 A1    Sep. 18, 2008

Related U.S. Application Data

(63) Continuation of application No. 10/532,195, filed on Sep. 26, 2005, now abandoned.

(30) Foreign Application Priority Data

Nov. 6, 2002    (EP) ...................................... 02405954

(51) Int. Cl.
G06F 7/04      (2006.01)
G06F 15/16    (2006.01)
(52) U.S. Cl. .............................. 726/6; 713/168; 713/171
(58) Field of Classification Search ....................... 726/6
See application file for complete search history.

(56) References Cited

U.S. PATENT DOCUMENTS

| | | | | |
|---|---|---|---|---|
| 4,890,321 A * | 12/1989 | Seth-Smith et al. | .......... | 380/231 |
| 5,604,803 A * | 2/1997 | Aziz | .............................. | 713/155 |
| 5,778,065 A * | 7/1998 | Hauser et al. | ................. | 713/155 |
| 5,812,671 A * | 9/1998 | Ross, Jr. | ........................ | 713/153 |
| 5,812,991 A * | 9/1998 | Kara | .............................. | 705/410 |
| 5,850,444 A * | 12/1998 | Rune | ................................ | 705/79 |
| 6,219,669 B1 * | 4/2001 | Haff et al. | .............................. | 1/1 |
| 6,300,873 B1 * | 10/2001 | Kucharczyk et al. | ...... | 340/568.1 |
| 6,993,666 B1 | 1/2006 | Hokkanen et al. | | |
| 7,093,128 B2 * | 8/2006 | Asano et al. | ................. | 713/171 |
| 7,228,438 B2 * | 6/2007 | Bushmitch et al. | ........... | 713/193 |
| 7,366,702 B2 * | 4/2008 | David | ............................. | 705/67 |
| 7,841,518 B2 * | 11/2010 | Sia | .................................. | 235/380 |
| 2002/0073046 A1 * | 6/2002 | David | ............................. | 705/67 |
| 2002/0138850 A1 * | 9/2002 | Basil et al. | .................... | 725/117 |
| 2002/0141588 A1 * | 10/2002 | Rollins | ........................ | 380/277 |
| 2002/0159601 A1 * | 10/2002 | Bushmitch et al. | ........... | 380/277 |

(Continued)

*Primary Examiner* — Matthew Henning
(74) *Attorney, Agent, or Firm* — Michael J. Buchenhorner; Vazken Alexanian

(57) ABSTRACT

A method for providing a user device with a set of access codes comprises, in the user device, storing an encryption key a an identification code, and sending a message containing the identification code to a server via a communications network. In the server, an encryption key is stored corresponding to the key stored in the user device, allocating the set of access codes on receipt of the identification code from the user device. A look up function is performed based on the identification code received in the message to retrieve the key from storage. The set of access codes is encrypted using the retrieved key to produce an encrypted set. A message containing the encrypted set is sent to the user device via the network. In the user device, the encrypted set received from the server is decrypted using the key in storage, and storing the decrypted set of access codes for use by a user of the user device.

14 Claims, 7 Drawing Sheets

U.S. PATENT DOCUMENTS

| | | | |
|---|---|---|---|
| 2003/0016821 A1* | 1/2003 | Hammersmith | 380/37 |
| 2003/0182576 A1* | 9/2003 | Morlang et al. | 713/201 |
| 2004/0083373 A1* | 4/2004 | Perkins et al. | 713/189 |
| 2005/0167491 A1* | 8/2005 | Sia | 235/382 |
| 2006/0129847 A1* | 6/2006 | Pitsos | 713/193 |
| 2006/0168657 A1* | 7/2006 | Baentsch et al. | 726/21 |
| 2008/0226076 A1* | 9/2008 | Baentsch et al. | 380/270 |

* cited by examiner

PROVIDING A USER DEVICE WITH A SET OF ACCESS CODES

CROSS-REFERENCE TO RELATED APPLICATIONS

This application is a continuation of, and claims priority from, commonly-owned U.S. patent application Ser. No. 10/532,195, filed on Sep. 26, 2005, now abandoned which application is incorporated by reference in its entirety herein.

FIELD OF THE INVENTION

The present invention generally relates to methods, apparatus, and computer program elements for providing a user device with sets of access codes such as one time authentication codes via data communications networks such as wireless communications networks.

BACKGROUND OF THE INVENTION

One time authentication codes (OTACS) with paper based scratch lists of transaction authentication numbers (TANS) or one time credit card numbers are increasingly popular in the field of on line transactions. It would be desirable to permit secure storage and distribution of OTACs. It would be equally desirable to permit convenient access to OTACs wherever and whenever needed. Unfortunately, paper based scratch lists are both relatively insecure and inconvenient to access. Typically, a scratch list is sent from a service provider such as a bank to a customer via plain mail. A mailed scratch list can be intercepted en route to the customer and copied. In addition, many customers cannot be relied upon to store scratch lists in a secure location such as a safe. This is especially the case where the scratch list is used regularly. A regularly used scratch list may be left in the open, on a desk for example. This provides others with access to the scratch list. If a scratch list is carried by a customer, it may be lost or stolen. OTACs on scratch lists are not usually encrypted. Customer account numbers, which are generally combined with an OTAC to effect a transaction, are widely regarded as being publicly known. It is inconvenient for many customers to manually keep track of which OTACs have been used. When moving from one scratch list to another, customers need to temporarily store or carry two scratch lists. This enhances security risk. Furthermore, paper based scratch lists are complicated for the issuing service providers to print and mail in a timely manner.

WO98/37524 describes a transaction method using a mobile device. This method employs International Debit User Identification (IDUI) numbers to identify individual accounts. The IDUI is analogous to a customer bank account number. Specifically, the IDUI is pre-loaded onto credit/debit card. In operation, a point of sale (POS) terminal reads the IDUI from a credit/debit card and display an amount to be deducted from an identified account. The customer completes the transaction by pressing an OK button of the POS terminal. The POS terminal sends a transaction receipt to a server in the bank responsible for the account. WO98/37524 proposes pre-storing the IDUI on a Subscriber Identification Module (SIM) smart card as used in GSM mobile phone networks instead of on a magnetic strip or memory card. The IDUI is then read from the smart card by the terminal in a contact-less manner. Transaction receipts are sent to the server for verification by SMS messages. This scheme discusses only the uses of IDUIs for transactions with POS terminals via a contact-less interface and exchanging SMS messages for transaction verification. The scheme is not suitable for OTAC delivery. This is because IDUIs are fixed for each account. OTACs, however, are not. Similar electronic payment systems are described in EP1 176 844, WO99/16029, WO00/495585, WO01/09851, WO02/21464, and WO01/93528.

SUMMARY OF THE INVENTION

In accordance with the present invention, there is now provided a method for providing a user device with a set of access codes, the method comprising: in the user device, storing an encryption key and an identification code, and sending a message containing the identification code to a server via a communications network; in the server, storing an encryption key corresponding to the key stored in the user device, allocating the set of access codes on receipt of the identification code from the user device, performing a look up function based on the identification code received in the message to retrieve the key from storage, encrypting the set of access codes using the retrieved key to produce an encrypted set, and sending a message containing the encrypted set to the user device via the network; and, in the user device, decrypting the encrypted set received from the server using the key in storage, and storing the decrypted set of access codes for use by a user of the user device.

This advantageously provides a scheme for providing access codes such as OTACs to customers in a convenient yet secure manner.

Preferably, the method further comprises: in the server, generating a new key, encrypting the new key with the previous key, and sending a message containing the encrypted new key to the user device via the network; and, in the user device, decrypting the new key received from the server using the previous key, and storing the decrypted new key in place of the previous key.

This advantageously provides additional security by facilitating secure refreshment of keys employed.

The method may also extend to, in the server, encrypting a new set of access codes with the new key to produce a new key encrypted set, and sending a message containing the new key encrypted set to the user device via the network; and, in the user device, decrypting the new key encrypted set using the new key, and storing the decrypted new set for use by a user of the user device.

This advantageously provides for secure refreshment of the access codes in a convenient manner.

Preferably, the method further comprises: in the server, sending a message containing a new set of access codes to the user device via the network; and, in the user device, storing the new set for use by a user of the user device. The method may further comprise: in the user device, tracking the access codes used by the user, generating a request in response to the number of unused access codes reaching a predetermined threshold, and sending a message containing the request to the server; and, in the server, sending the message containing the new set of access codes on receipt of the request. Alternatively, the method may comprise: in the server, tracking the access codes used by the user, and sending the message containing the new set of access codes to the user device in response to the number of unused access codes reaching a predetermined threshold. In another alternative, the method may comprise: in the user device, generating a request in response to a manual input from the user, and sending a message containing the request to the server; and, in the server, sending the message containing the new set of access codes on receipt of the request.

In a preferred embodiment of the present invention, the method further comprises: in the user device, generating a public/private key pair, and sending a message containing the public key of the pair to the server via the network; in the server, generating a session key, encrypting the set of access codes with the session key to produce a session key encrypted set, encrypting the session key with the public key to produce an encrypted session key, sending a message containing the session key encrypted set and the encrypted session key to the user device via the network; and, in the user device, decrypting the encrypted session key with the private key of the pair to recover the session key, decrypting the session key encrypted set with the recovered session key to recover the set, and storing the decrypted set for use by a user of the user device.

This advantageously provides further security via multiple key encryption.

Viewing the present invention from another aspect, there is now provided a method for providing a user device with a set of access codes, the method comprising, in the user device: storing an encryption key and an identification code; sending a message containing the identification code to a server via a communications network; receiving from the server a message containing the set of access codes encrypted with the key; decrypting the received set of access codes using the key in storage; and, storing the decrypted set of access codes for use by a user of the user device. The present invention also extends to a computer program element comprising computer program code mean when loaded in a processor of a user device, configures the processor to perform a method as described in this paragraph.

Viewing the present invention from yet another aspect, there is now provided, a method for providing a user device with a set of access codes, the method comprising, in a server for communicating with the user device via a network: storing an encryption key corresponding to an encryption key stored in the user device; allocating the set of access codes to the user device on receipt of a message containing an identification code from the user device via the network; performing a look up function based on the identification code received in the message to retrieve the key from storage; encrypting the set of access codes using the retrieved key to produce an encrypted set; and, sending a message containing the encrypted set to the user device via the network. The present invention also extends to a computer program element comprising computer program code mean when loaded in a processor of a server computer system, configures the processor to perform a method as described in this paragraph.

In a particularly preferred embodiment of the present invention, the access codes are one time authentication codes. Similarly, in a preferred embodiment of the present invention, the network comprises a wireless communication network. The user device may comprise a mobile phone. Similarly, the user device may comprise a smart card. In an especially preferred embodiment of the present invention, the messages are SMS messages.

Viewing the present invention from still another aspect, there is now provided apparatus for providing a user with a set of access codes, the apparatus comprising: a user device; and, server for communicating with the user device via a communications network; the user device comprising means for storing an encryption key and an identification code, and means for sending a message containing the identification code to the server via the network; the server comprising means for storing an encryption key corresponding to the key stored in the user device, means for allocating the set of access codes on receipt of the identification code from the user device, means for performing a look up function based on the identification code received in the message to retrieve the key from storage, means for encrypting the set of access codes using the retrieved key to produce an encrypted set, and means for sending a message containing the encrypted set to the user device via the network; and, the user device further comprising means for decrypting the encrypted set received from the server using the key stored in the user device, and means for storing the decrypted set of access codes for use by the user.

The present invention further extends to a user device for receiving a set of access codes from a server via a communications network, the device comprising: means for storing an encryption key and an identification code; means for sending a message containing the identification code to a server via a communications network; means for receiving from the server a message containing the set of access codes encrypted with the key; means for decrypting the received set of access codes using the key in storage; and, means for storing the decrypted set of access codes for use by a user of the user device.

Additionally, the present invention extends to a server for providing a user device with a set of access codes via a communications network, the server comprising: means for storing an encryption key corresponding to an encryption key stored in the user device; means for allocating the set of access codes to the user device on receipt of a message containing an identification code from the user device via the network; means for performing a look up function based on the identification code received in the message to retrieve the key from storage; means for encrypting the set of access codes using the retrieved key to produce an encrypted set; and, means for sending a message containing the encrypted set to the user device via the network.

In a preferred embodiment of the present invention, there is provided a secure transaction scheme which is both more secure and more convenient for both customers and, for example, banking service providers compared with conventional schemes. A particularly preferred embodiment of the present invention comprises: a smart card on which one or more scratch lists are stored in a tamper resistant manner; a mobile device for conveniently accessing the scratch lists stored on the smart card; and, encrypted messaging over a wireless communications channel between the mobile device and a server computer for updating the scratch lists stored on the smart card. Advantageously, no assumptions need be made regarding the security or encryption capabilities of the wireless communications channel. The mobile device may be a mobile phone, personal digital assistant (PDA) or the like. The smart card may be a SIM module for insertion into a mobile phone or the like. The wireless communications channel may be a Short Message Service (SMS) in a GSM channel or the like.

In a particularly preferred embodiment of the present invention to be described shortly, the mobile device is implemented by a mobile phone; the smart card is implemented by a SIM module, and the wireless communications channel is implemented by an SMS channel in a GSM network. In this embodiment, the customer is equipped with a mobile phone having a SIM module. The SIM module comprises a central processing unit and a memory. JAVA® (trademark of ORACLE®) compatible operating platform software and JAVA® tool kit applet software are stored in the memory. The operating platform software configures the CPU for executing the tool kit. The tool kit facilitates handling of OTACs. The tool kit may be loaded into the memory during personalizing of the SIM for the customer. Alternatively, if permitted by the GSM network service provider, the tool kit may be loaded into the memory and refreshed dynamically via the GSM network. Access to the tool kit in the memory is protected by a Personal Identification Number (PIN) set by the customer via the mobile phone.

In an especially preferred embodiment of the present invention, a bank sends the customer an initializing paper mail via the conventional postal system. The initializing paper mail contains: a customer specific symmetrical key K, such as a 16 byte DES key; a customer identification (ID) code N; and a phone number for an SMS compatible server at the bank. The ID code N is used by the bank to identify the customer. The ID code need not be the customer's account number and may instead be implemented by unique random information.

On initial activation by the customer, the tool kit asks the customer to enter the key K, the information N, and the phone number of the server via the keypad of the mobile phone. The tool kit then sends an initialization SMS message containing the identification code N to the server. The initialization message indicates that the tool kit is enabled. The server responds to receipt of the initialization message by sending an SMS reply message to the customer containing a list of OTACs encrypted with the key K. The OTAC list may be spread across a series of SMS messages depending on the amount of data to transferred. The tool kit decrypts the OTAC list received using the key K. Initialization is then complete. When the customer needs an OTAC, to perform an on-line banking transaction over the Internet for example, the customer again enters the PIN into the mobile phone to unlock the tool kit and requests from the tool kit the next OTAC or a specific OTAC, depending on the bank's OTAC allocation system. The tool kit keeps track of the OTACs issued. When all the OTACs stored by the tool kit have been issued, a new OTAC list is obtained from the server. The new list is again delivered via the SMS channel as herein before described. The server also keeps track of how many and which OTACs have been used by each customer at any time, and automatically initiates updates when required. Note this scheme involves only an end to end encryption between the server and the tool kit in the customer's SIM module. No assumptions need be made regarding the security of the intervening wireless channel.

In another preferred embodiment of the present invention, the key K can be updated on demand by sending a new key K' encrypted with the key K to the tool kit from the server via the wireless channel. Thereafter, the tool kit accepts only messages encrypted with the new key K'. Distribution of the new key K' may be performed with distribution of new OTAC lists. Alternatively, distribution of the new key K' may be performed independently of new OTAC list distribution.

In yet another preferred embodiment of the present invention, the server may send another key S encrypted with the key K to the tool kit via the wireless channel. The other key S may be used for signature verification for example. Further messages from the server are then signed with the signature key S prior to being encrypted with the key K. The tool kit can then verify the signature accordingly.

In a further embodiment of the present invention, asymmetric cryptography is employed in place of the symmetric cryptography herein before described. In this case, the customer need not manually enter the initial symmetric key K. Instead, the tool kit generates a public/private key pair, such as a 1024 bit RSA key pair, on the SIM module. The tool kit then enables itself by sending the public key E together with the ID code N to the server via the communications channel. For each message to the tool kit, the server now generates a symmetric session key. In each case, the server encrypts the message with the secure session key, encrypts the session key with the public key E, and sends the encrypted message, together with the encrypted session key to the tool kit via the wireless channel. The tool kit decrypts the session key with it private key D. The tool kit then decrypts the or each message using the decrypted session key to recover the OTAC list.

The server may also employ a public/private key pair for signature generation and verification, sending its public key to the tool kit for future verification actions. Note that the server may issue the same public key for signature verification to all tool kits, possibly signed by a trusted third party certificate authority having a public key pre-stored on the smart card.

In a further embodiment of the present invention, at least one of the mobile device and the smart card comprises a contact-less interface such as an infrared or inductive interface. The interface permits access to the tool kit on the smart card via a data terminal. OTACs can be read through the interface on issuance of a request from the customer via the data terminal. Such a request may be issued for example via a keyboard of the data terminal. Alternatively, OTACs may be read through the interface without requiring such manual requests. Various challenge and response schemes may be employed between the smart card and the data terminal. For example, the data terminal itself may not gain access to the OTAC. Instead, the data terminal may send a challenge to the tool kit. In turn, the tool kit generates a response to the challenge based on the OTAC. For example, if the OTAC effectively comprises a cryptographic key, such as a 3 DES key, the tool kit may digitally sign and/or encrypt the challenge with the OTAC. The response thus calculated may be used for authentication or to enable a transaction.

It will be appreciated that advantages of the present invention are manifold. One advantage of the present invention in that it provides a secure technique for distributing OTACs to user devices. Examples of such user devices include mobile devices equipped with tamper resistant smart card technology, without preventing convenient access to the OTACs whenever and wherever needed. Such access can be manually initiated or automatically initiated via a wireless channel. The present invention is particularly attractive for banking applications because no changes are required to typical computer infrastructures conventionally employed in banks. Distribution of OTAC lists is made cheaper, simpler, and more secure. Furthermore, utilizing existing infrastructure means that no additional OTAC specific mobile devices and/or smart cards need be issued to customers already in possession of a mobile phone with a SIM card that allows downloading and execution of tool kit applets.

BRIEF DESCRIPTION OF THE DRAWINGS

Preferred embodiment of the present invention will now be described, by way of example only, with reference to the accompanying drawings, in which.

DETAILED DESCRIPTION

Figure 1:
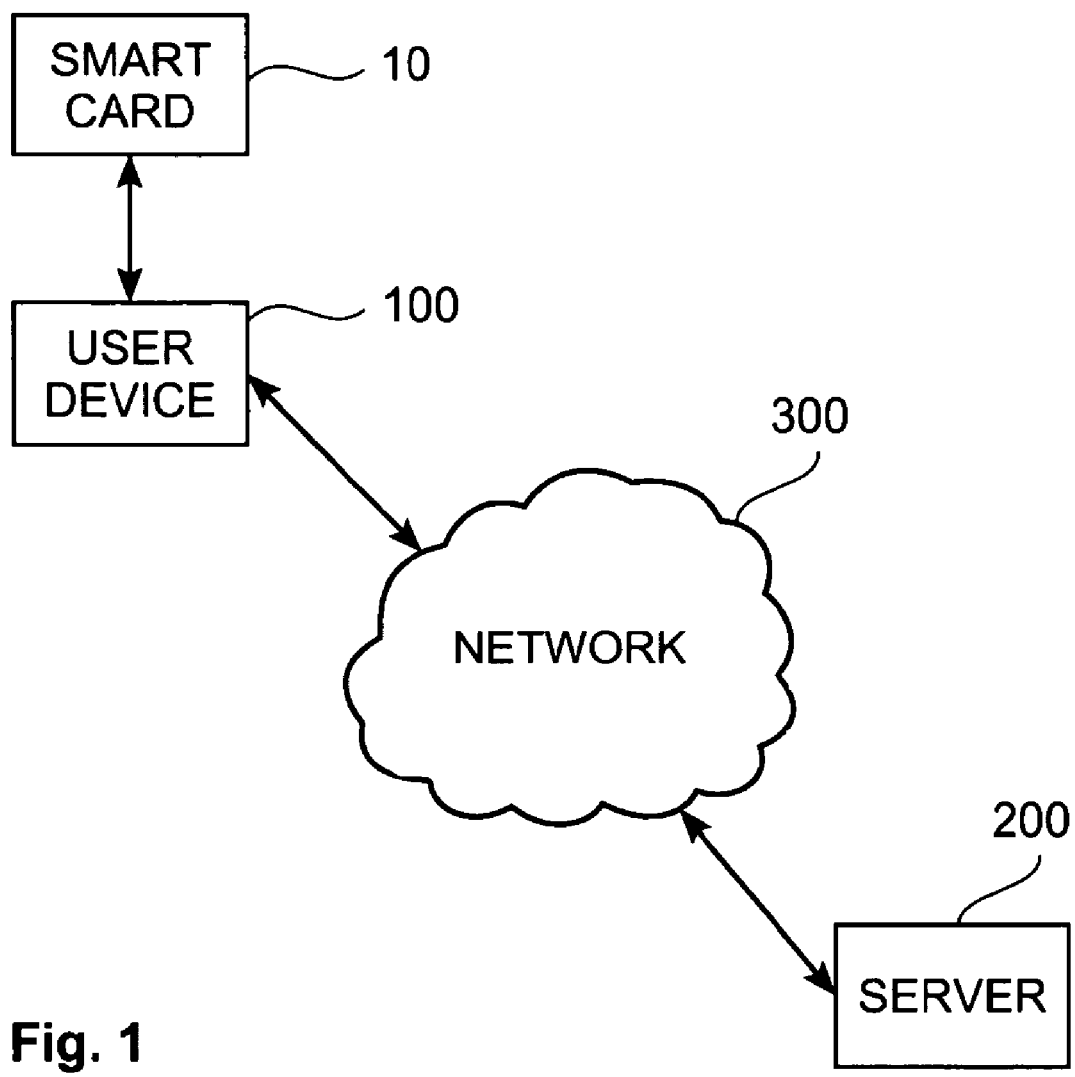
FIG. 1 is a block diagram of a data processing network.

Referring first to FIG. 1, a data processing network embodying the present invention comprises a user device 100 in the form of a mobile phone connectable to a server computer system 200 via a communications network infrastructure 300 having a wireless access network in the form of a GSM access network. A smart card 10 in the form of a SIM card is also connectable to the network via the user device 100.

Figure 2:
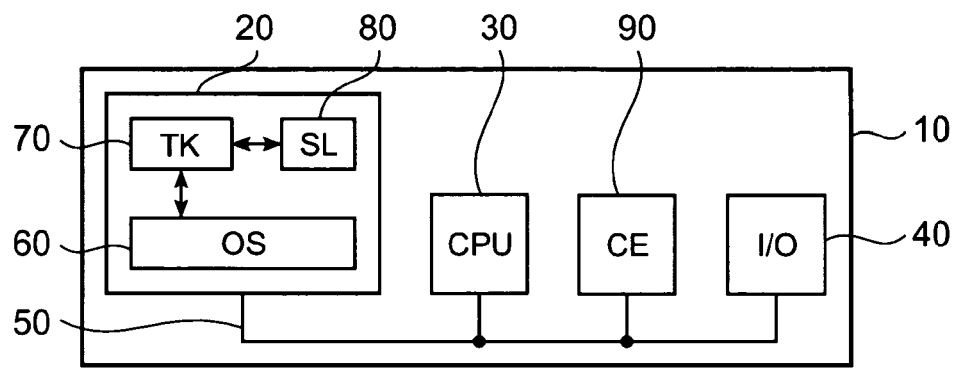
FIG. 2 is a block diagram of a smart card of the network.

With reference now to FIG. 2, the smart card 10 comprises a memory 20, a central processing unit (CPU) 30, an encryption engine 90, and an input/output (I/O) subsystem 40, all interconnected via a bus subsystem 50. In the memory 20 is stored computer program code executable by the CPU 30. The computer program code comprises an operating system 60 in the form of a JAVA® technology compatible operating platform and tool kit 70 application software in the form of a JAVA® applet. JAVA® is a registered trademark of ORACLE® in the United States and other countries. The memory 20 also facilitates the storage of a scratch list 80 in a tamper resistant manner. The scratch list 80 comprises a plurality of OTACs. The operating system 60 configures the CPU 30 for executing the tool kit 70. The tool kit 70 facilitates handling of OTACs in the scratch list 80. Aspects of the functionality of the tool kit 70 will be described in detail shortly. The encryption engine 80 comprises cryptographic processing logic for encrypting and decrypting data to be transmitted from and received by the smart card 10. The cryptographic processing logic may be implemented in hardware, software, or hardware and software in combination.

Figures 3, 4:
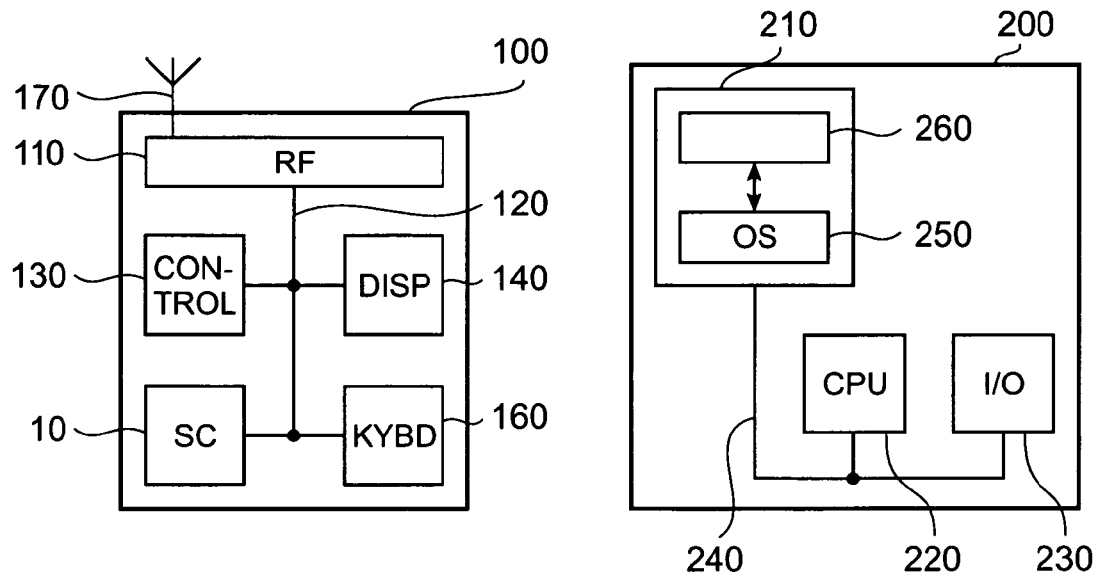
FIG. 3 is a block diagram of a mobile device of the network.
FIG. 4 is a block diagram of a server computer system of the network.

Referring to FIG. 3, the user device 100 comprises a radio frequency (RF) stage 110 having an RF antenna 170, control logic 130, a visual display 140, and a keypad 160 all interconnected by a bus subsystem 120. The smart card 10 is removeably inserted into the user device 100 and the I/O subsystem 40 of the smart card 10 is releasably connected to the bus subsystem 120 of the user device 100. In operation, the RF stage 110 and RF antenna facilitate wireless communications between the user device 100 and other devices connected to the network 300. The visual display 140 provides a graphical user interface between the user and the mobile devices for functions such as preparing messages and reading messages. The key pad 160 provides the user with keyboard control of the user device 10 for functions such as data entry and call handling. The control logic 130 controls functions of the user device 100 such as call handling based on inputs received from, for example, the keypad 160. Outputs from the user device 100, such as data displays on the visual display unit 140 or outgoing calls via the RF stage 110, are also controlled by the control logic 130. Similarly, the control logic 130 coordinates transfers of data from the smart card 10 and the other elements of the user device 100 via the bus subsystem 120. The control logic 130 may implemented in dedicated hardware, a programmed CPU, or a combination of a dedicated hardware and a programmed CPU.

With reference to FIG. 4, the server 200 comprises a memory 210, a CPU 220, and an I/O subsystem 230 all interconnected by a bus subsystem 240. In the memory 210 is stored computer program code executable by the CPU 220. The computer program code comprises an operating system 250 and OTAC service application software 260. The operating system 250 configures the CPU 220 for executing the OTAC service 260. The OTAC service 260 facilitates handling of OTACs in the user device 100. Aspects of the functionality of the OTAC service 260 will be described in detail shortly.

In operation, a wireless communication channel in the form of an SMS channel is established between the user device 100 and the server 200. The SMS channel facilitates secure transfer of the scratch list 80 from the OTAC service 260 in the server 200 to the smart card 10 via the user device 100. The tool kit 70 may be loaded into the memory 20 of the user device 100 during configuration of the smart card 10 for the user. Alternatively, if permitted by the network infrastructure 300, the tool kit 70 may be loaded into the memory 20 and refreshed dynamically via the network infrastructure 300. Access to the tool kit 70 in the memory 20 is protected by a PIN set by the user via the user device 100. The keypad 160 may be employed for this purpose. Alternatively, if the user device 100 has voice recognition, the PIN may be set and reset orally. Other devices may support still further means of data entry.

In a particularly preferred application of the present invention, the server 200 is located at a bank and the user of the user device 100 is a customer of the bank. Initially, the bank supplies the user with a paper mail. The paper mail may be supplied via, for example, the conventional postal system. The paper mail contains: a customer specific symmetrical key K, such as a 16 byte DES key; a customer identification (ID) code N; and a phone number for accessing the server 200 via the network infrastructure 300. The banks uses the ID code N to identify the user. The ID code need not be the user's customer account number and may instead be implemented by unique random information.

Figure 5:
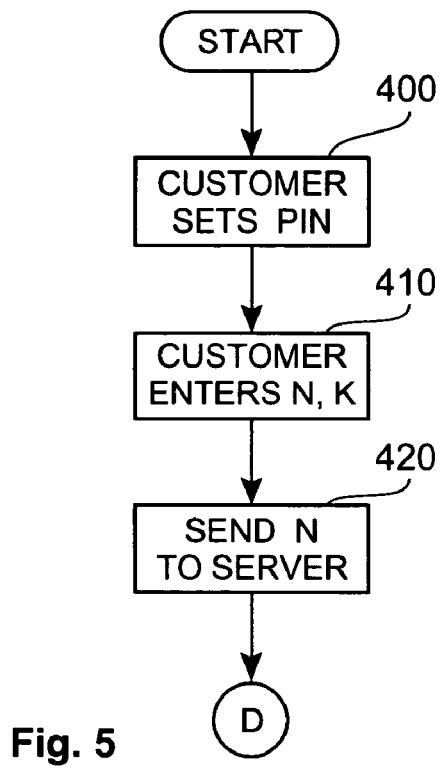
FIG. 5 is a flow chart associated with the smart card.
Figure 6:
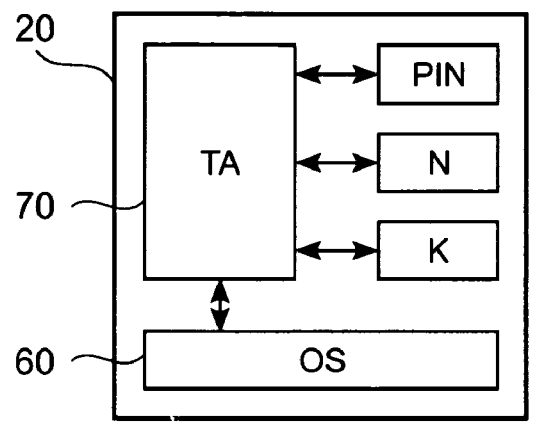
FIG. 6 is a block diagram of a memory of the smart card.

Referring now to FIG. 5, to activate the tool kit 70 for the first time, the user enters the PIN via the key pad 160. See step 400. On receipt of the PIN, the tool kit 70 requests that the user enters the key K, the ID code N, and the phone number of the server 200 via the key pad 160. See step 410. Again, if the user device 100 has voice recognition, this data may be entered orally. However, it will be appreciated that, this is a less secure entry technique as the user may be overheard reciting the data. On receipt of the above-listed user entries, the tool kit 70 sends an initialization SMS message containing the identification code N to the OTAC service 260 on the server 200. See step 420. The initialization message indicates to the OTAC service 260 that the tool kit 70 has been enabled. With reference to FIG. 6, the memory 20 on the smart card now contains the PIN, the key K, and the ID code N.

Figure 7:
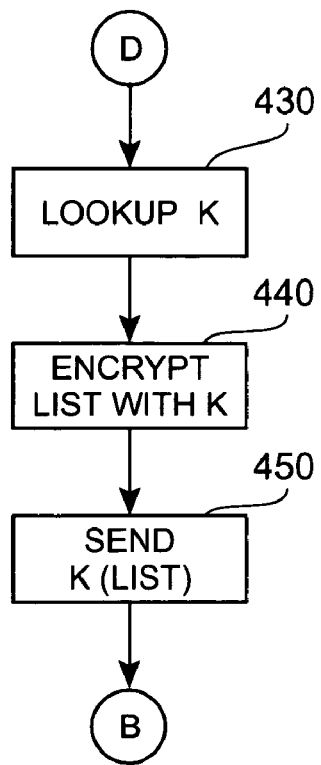
FIG. 7 is a flow chart associated with the server.

Referring to FIG. 7, on receipt of the initialization message at the server 200, the OTAC service 260 looks up the user based on the ID code N and retrieves the key K issued to the user. See step 430. The OTAC service 260 then encrypts a new scratch list of OTACs for the user with the key K. See step 440. The OTAC service 260 then sends a SMS reply message containing the encrypted list to the tool kit 70. The list may be spread across a series of SMS messages depending on the amount of data to transferred.

Figure 8:
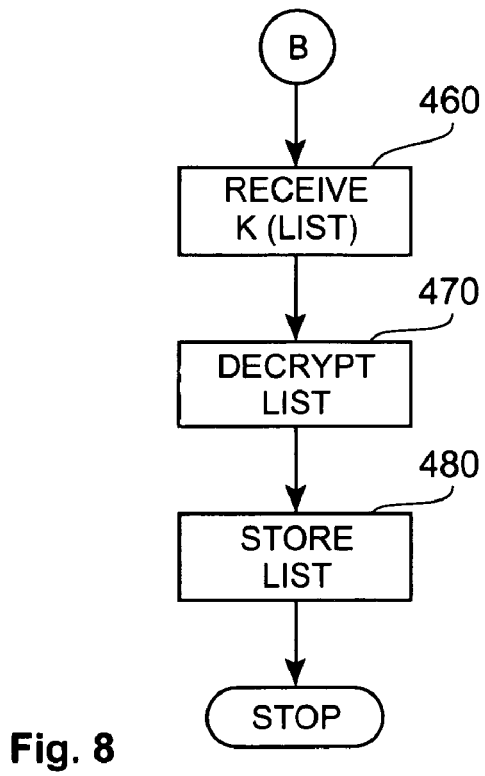
FIG. 8 is another flow chart associated with the smart card.
Figure 9:
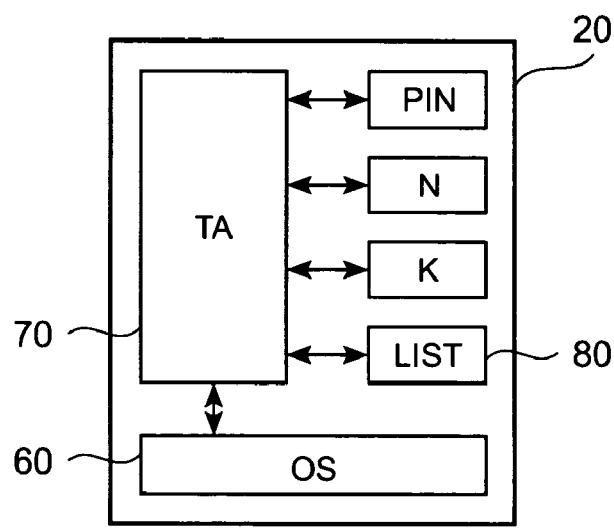
FIG. 9 is another block diagram of the smart card memory.

Turning to FIG. 8, on receipt of the reply message at the user device 100, the tool kit 70 extracts the encrypted list. See step 460. The tool kit 70 utilizes the encryption engine 90 to decrypt the list using the key K. See step 470. The tool kit 70 then stores the decrypted list in the memory 60. See step 480. Initialization is then complete. With reference to FIG. 9, the memory 20 now contains, the key K, the PIN, the ID code N, and the list of OTACs.

Figure 10:
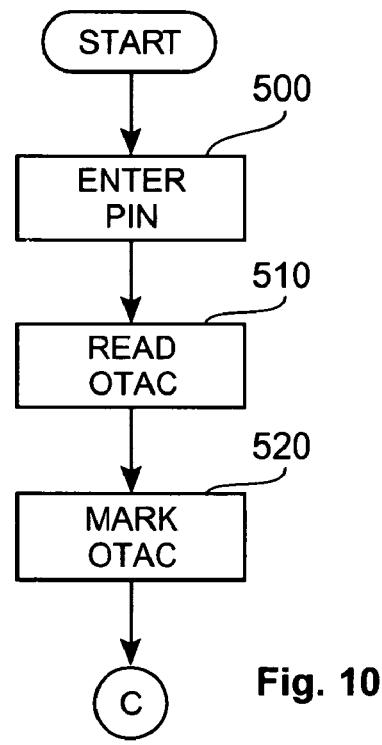
FIG. 10 is yet another flow chart associated with the smart card.

Referring now to FIG. 10, when the user needs an OTAC, to perform a banking transaction over the Internet for example, the user again enters the PIN via the key pad 160 to unlock the tool kit 70. See step 500. The user then requests an OTAC from the tool kit 70. See step 510, the OTAC may be the next OTAC in the list or a specific OTAC, depending on the OTAC allocation system employed by the bank. The tool kit 70 tracks the OTACs issued. See step 520.

Figure 11:
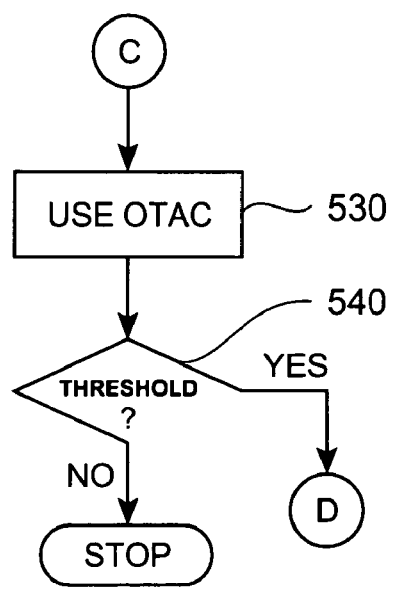
FIG. 11 is another flow chart associated with refreshment of OTACs stored in the memory of the smart card.

Numerous methods may be employed for refreshing the list 80 of OTACs stored in the memory 20. For example, in a preferred embodiment of the present invention, refreshment of the list 80 of OTACs is automatically triggered by the tool kit 70. Specifically, referring to FIG. 11, each time an OTAC is used, at 530, a test is performed by the tool kit 70 to determine if the number of unused OTACs remaining in the list 80 is less than a predetermined threshold. See 540. In the event that the number of unused OTACs is greater than the threshold, the tool kit 70 waits for the next OTAC to be used. However, in the event that the threshold is reached, the tool kit 70 automatically generates and sends a message to the server 200 via the network 300 to request a new list of OTACs. The ID code N is included in the request message as herein before described with reference to FIG. 5 in order that the OTAC service 260 in the server 200 can look up the appropriate key for encrypting the new list of OTACS. Specifically, the new list is delivered to the smart card 10 via the channel as herein before described with reference to FIG. 7. In another embodiment of the present invention, the list 80 of OTACs stored in the memory 20 is automatically refreshed by the OTAC service 260 on the server 200. Specifically, referring again to FIG. 11, the OTAC service 260 on the server 200 now keeps track of how many and which OTACs have been used by each user at any time. See step 530. Each time an OTAC is used, the OTAC service 260 determines if the number of unused OTACs remaining on the list is less than a predetermined threshold. See step 540. If not, the OTAC service 260 waits for the next OTAC to be used. If so, the OTAC service 260 automatically sends a new list, encrypted with the key K, to the tool kit 70 as herein before described with reference to FIG. 7. The thresholds herein before described may be set such that a new list 80 is issued when all previously issued OTACs are used up. Alternatively, the thresholds may be set such that a new list 80 is issued when only a preset number of OTACs are left unused in the previous list. In yet another embodiment of the present invention, refreshment of the list 80 of OTACs stored in the memory 20 may be triggered manually by the user. Specifically, in response to manual input to the user device 100, the tool kit 70 generates and sends a message to the server 200 via the network 300 to request a new list of OTACs. The ID code N is included in the request message as herein before described with reference to FIG. 5 in order that the OTAC service 260 in the server 200 can look up the appropriate key for encrypting the new list of OTACs. Again, the new list is delivered to the smart card 10 via the channel as herein before described with reference to FIG. 7. Note that these refreshment schemes involve only end to end encryption between the OTAC service 260 and the tool kit 70. No assumptions need be made regarding the security of the intervening network infrastructure 300.

Figure 12:
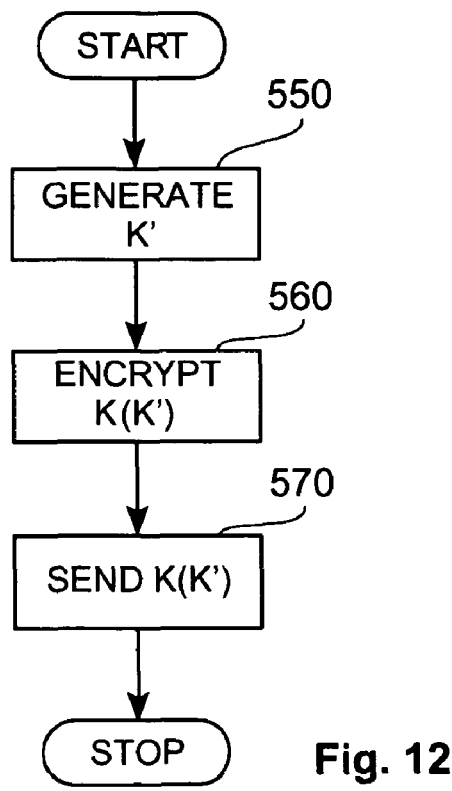
FIG. 12 is yet another flow chart associated with the server.

In a modification to the preferred embodiment of the present invention herein before described with reference to FIGS. 5 to 11, the key K stored in the memory 20 can be updated on demand. Specifically, referring to FIG. 12, the OTAC service 260 generates a new key K'. See step 550. The OTAC service 260 encrypts the new key K' with the existing key K. See step 560. The OTAC service 260 then sends a SMS message containing the new key K' encrypted by the existing key K to the tool kit 70 via the network infrastructure 300.

Figure 13:
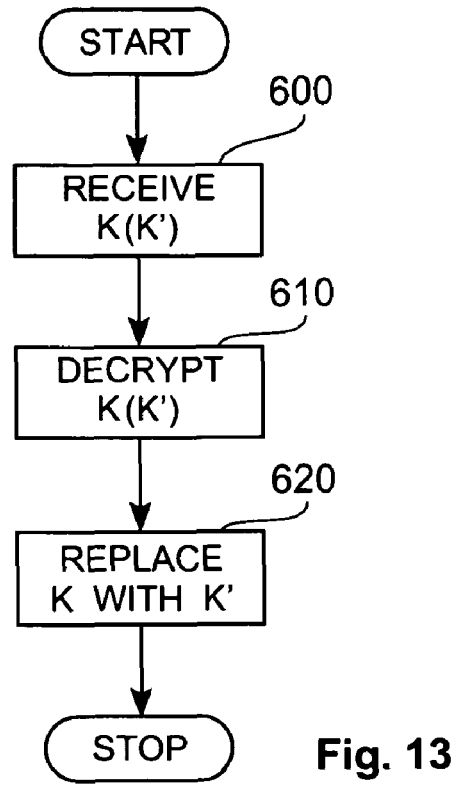
FIG. 13 is a further flow chart associated with the smart card.

Referring to FIG. 13, the tool kit 70 receives the encrypted new key K'. See step 600. The tool kit 70 decrypts the new key K' via the encryption engine 280 using the preexisting key K stored in the memory 20. See step 610. Then, the tool kit 70 replaces the preexisting key K in the memory 20 with the new key K'. Thereafter, the tool kit 70 accepts only messages encrypted with the new key K'. Distribution of the new key K' may be performed with distribution of new lists by the server 200. Alternatively, distribution of the new key K' may be performed independently of new list distribution.

In another modification of preferred embodiment of the present invention herein before described with reference to FIGS. 5 to 11, the OTAC service 260 sends another key S encrypted with the key K to the tool kit 70 via the network infrastructure 300. The other key S may be used for signature verification for example. Further messages from the OTAC service 260 are then signed with the signature key S prior to encryption with the key K. The tool kit 70 can then verify the signature accordingly. Keys K and S are not necessarily different.

Figure 14:
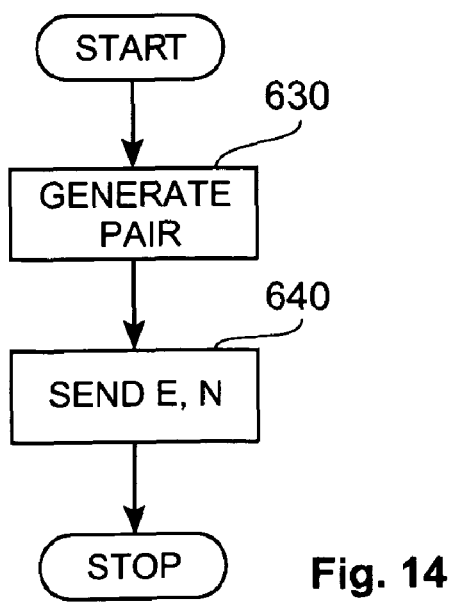
FIG. 14 is still another flow chart associated with the smart card.

In the preferred embodiments of the present invention herein before described, symmetric cryptography is employed. However, in another embodiment of the present invention, asymmetric cryptography is employed. In this embodiment, the user need not manually enter the initial symmetric key K. Referring to FIG. 14, the tool kit 70, via the encryption engine 280, instead generates a public/private key pair such as a 1024 bit RSA key pair. See step 630. The tool kit 70 then sends the public key E of the pair together with the ID code N to the OTAC service 260 via the network infrastructure 300. See step 640. The tool kit 70 is now enabled.

Figure 15:
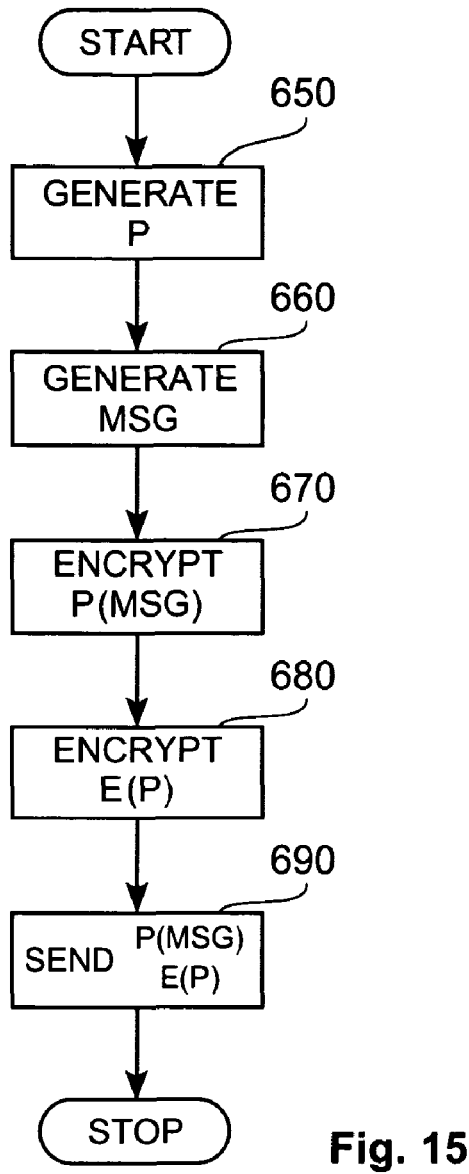
FIG. 15 is a further flow chart associated with the server.
Figure 16:
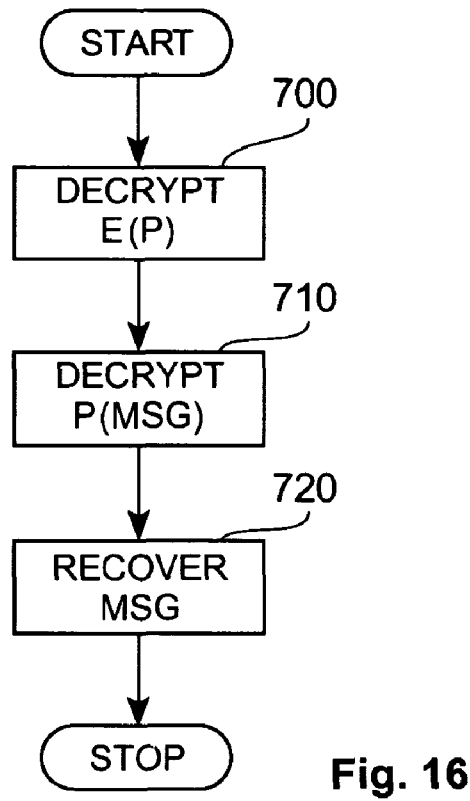
FIG. 16 is also a flow chart associated with the smart card.

Referring now to FIG. 15, the OTAC service 260 now generates a symmetric secure session key P. See step 650. The OTAC service 260 generates a message containing a list of OTACs. See step 660. The OTAC service 260 now encrypts the message with the session key P. See step 670. The OTAC service 260 also encrypts the session key P with the public key E. See step 680. The OTAC service 260 then sends the encrypted message, together with the encrypted session key P, to the tool kit 70 via the network infrastructure 300. See step 690. Referring to FIG. 16, the tool kit 70 decrypts the session key P with its private key D via the encryption engine 280. See step 700. The tool kit 70 then decrypts the message using the decrypted session key via the encryption engine 280. See step 710. Then, the tool kit 70 recovers the list from the decrypted message. See step 720.

In a preferred embodiment of the present invention, the OTAC service 260 also employs a public/private key pair for signature generation and verification. The OTAC service 260 sends its public key to the tool kit 70 for future verification actions. Note that the OTAC service 260 may issue the same public key for signature verification to all tool kits 70 it services, possibly signed by a trusted third party certificate authority having a public key pre-stored on the smart card 10.

Figure 17:
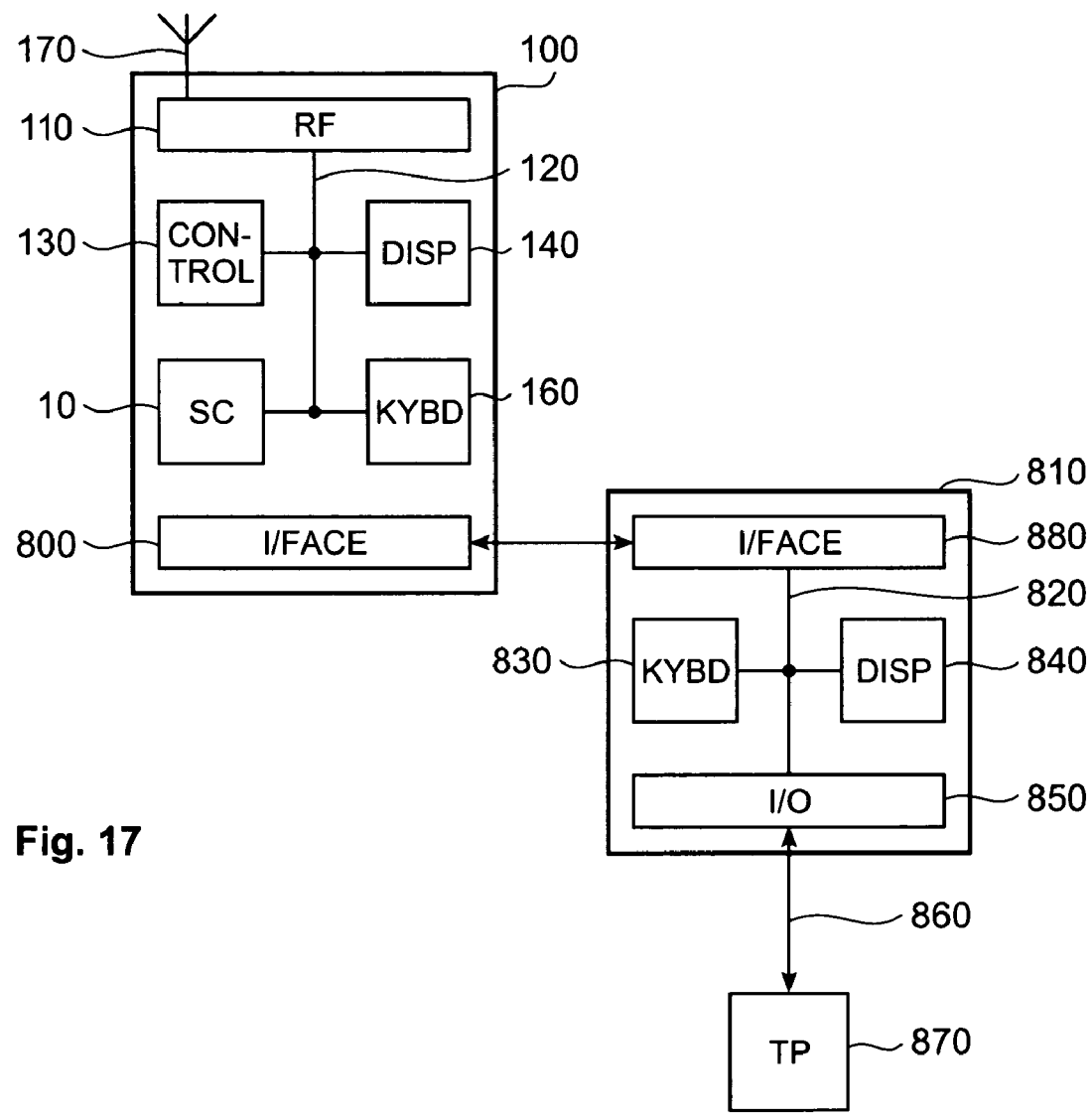
FIG. 17, is a block diagram of a data processing system embodying the present invention.

Referring to FIG. 17, in another embodiment of the present invention, the user device 100 comprises a contact-less interface 800 such as an infrared or inductive interface. The interface 800 permits access to the tool kit 70 on the smart card 10 via a data terminal 810. The data terminal 810 also comprises a contact-less interface 880 for communicating with the interface 800 of the user device 100. The data terminal 800 further comprises a keypad 830, display 840, and I/O subsystem 850 all interconnected, together with the interface 880 via a bus subsystem 820. The I/O subsystem 850 is connected to a remote transaction processing computer system 870 via an intervening data network 860.

In operation, OTACs can be read by the data terminal 810 from the smart card 10 resident in the user device 100 via the interfaces 800 and 880 in response to a request issued by the customer via the keypad 830 of the date terminal 810. Alternatively, OTACs may be read by the data terminal 810 through the interfaces 800 and 880 without requiring such manual requests. Various challenge and response schemes may be employed between the smart card 10 and the data terminal 810. For example, in a preferred embodiment of the present invention, the data terminal 810 does not gain access to the OTACs. Instead, the data terminal 810 sends a challenge to the tool kit 70 in the smart card 10. In turn, the tool kit 70 generates a response to the challenge based on the OTAC. For example, if the OTAC effectively comprises a cryptographic key such as a 3 DES key, the tool kit 70 may digitally sign and encrypt the challenge with the OTAC. The response thus calculated may be used for authentication or to enable a transaction. In other embodiments of the present invention, the contact less interface 800 may be integral to the smart card 800 rather than the user device 100.

In the preferred embodiments of the present invention herein before described, the user device 100 is in the form of a mobile phone. However, in other embodiments of the present invention, the user device 100 may be of a different form, such as a PDA, portable computer, desktop computer, or the like. Similarly, in the preferred embodiments of the present invention herein before described, a wireless network is employed for effecting communications between the user device 100 and the server 200. However, in other embodiments of the present invention a wired network or a combination of wireless and wired networks may be employed for effecting communications between the user device 100 and the server 200. Additionally, in the preferred embodiments of the present invention herein before described, wireless communications between the user device 100 and the server 200 are effected via an SMS channel. However, in other embodiments of the present invention, a different form of messaging service may be employed. Furthermore, in the preferred embodiments of the present invention herein before described, the smart card 10 is in the form of a SIM module. However, in other embodiments of the present invention, the smart card 10 may be in different form, such as a credit or charge card form factor. Other analogous forms of dedicated processor systems may be employed in place of the smart card 10. In the embodiments of the present invention, a JAVA® compliant operating system 60 is employed in the smart card 10 for executing the tool kit 70 in the form of a JAVA® applet. However, in other embodiments of the present invention, a different form of smart card operating system and a correspondingly different form of tool kit application software may be employed. Still furthermore, in the preferred embodiments of the present invention, the access codes are in the form of one time authentication codes. However, it will be appreciated that the present invention is equally applicable to delivery of other types of access codes, such as entry codes for gaining access to restricted areas, for example. Many other applications of the present invention will be apparent.

In summary, described herein by way of example of the present invention is a method for providing a user device with a set of access codes comprises, in the user device, storing an encryption key and an identification code, and sending a message containing the identification code to a server via a communications network. In the server, an encryption key is stored corresponding to the key stored in the user device, allocating the set of access codes on receipt of the identification code from the user device. A look up function is performed based on the identification code received in the message to retrieve the key from storage. The set of access codes is encrypted using the retrieved key to produce an encrypted set. A message containing the encrypted set is sent to the user device via the network. In the user device, the encrypted set received from the server is decrypted using the key in storage, and storing the decrypted set of access codes for use by a user of the user device.

What is claimed is:

1. A method for providing a user device with a set of access codes, the method comprising:
   receiving from a tool kit operably coupled with a user device operating within a wireless access network a first message requesting a set of access codes from a server, wherein the tool kit tracks access code usage of the user device and each time the user device uses an access code, the tool kit performs:
   comparing a number of unused access codes stored in the tool kit to a predetermined threshold level;
   when the number of unused access codes falls to the predetermined threshold level:
      automatically generating a first message to the server to request a new set of access codes without any intervening transmission from the user device;
      including in the first message an identification code associated with an encryption key stored in the server; and
      sending the first message to the server via the wireless communications network;
   wherein upon receipt of the first message, the server performs:
   allocating the set of access codes on receipt of the identification code from the tool kit;
   performing a look up function based on the identification code received in the message to retrieve the encryption key;
   encrypting the set of access codes using the retrieved encryption key to produce an encrypted set; and
   sending a second message containing the encrypted set to the tool kit for storing.

2. The method of claim 1 further comprising:
   the server tracking the access codes used by the user device, and sending the encrypted set to the user device in response to the number of unused access codes reaching the predetermined threshold level.

3. The method of claim 1 further comprising:
   receiving from the tool kit a third message comprising a public key of a public/private key pair generated at the tool kit;
   generating a session key;
   encrypting the set of access codes with the session key to produce a session key encrypted set;
   encrypting the session key with the public key to produce an encrypted session key; and
   sending a message containing the session key encrypted set and the encrypted session key to the tool kit via the network.

4. The method of claim 1, wherein the access codes are one time authentication codes.

5. The method of claim 1, wherein the user device comprises a mobile phone.

6. The method of claim 1, wherein the user device comprises a personal digital assistant.

7. The method of claim 1, wherein the tool kit is contained in a smart card.

8. The method of claim 1, wherein the messages are SMS messages.

9. A method for monitoring access code usage, said method comprising:
   a processor in a tool kit operably coupled with a user device and an encryption engine, said processor performing:
   tracking the access code usage of the user device;
   each time the user device uses an access code:
   comparing a number of unused access codes to a predetermined threshold level;
   responsive to the number of unused access codes reaching the predetermined threshold level automatically generating a first message to a server requesting a new set of access codes without any intervening transmission from the user device;
   wherein the server is in wireless communication with the user device;
   wherein the first message is automatically initiated via a wireless channel;
   wherein said first message comprises an identification code associated with an encryption key stored in the server, said identification code used by the server to retrieve said encryption key associated with the user device; and
   sending the first message to the server;
   receiving at the tool kit a second message from the server, said second message containing the new set of access codes encrypted with the retrieved encryption key;
   decrypting the new set of access codes using the encryption key stored in the tool kit; and
   storing the new set of access codes in the tool kit.

10. The method of claim 9 wherein receiving the second message further comprises receiving a new encryption key encrypted by the encryption key; and wherein the method further comprises:
   using the encryption key in storage to decrypt the new encryption key; and
   replacing the encryption key with the new encryption key.

11. A method for monitoring access code usage, said method comprising:
   a processor in a tool kit operably coupled with a user device, said processor performing:
   tracking the access code usage of the user device;
   comparing a number of unused access codes to a predetermined threshold level after each use;
   responsive to the number of unused access codes reaching the predetermined threshold:
   generating a public/private key pair;
   automatically generating a first message to a server requesting a new set of access codes without any intervening transmission from the user device; and
   sending the first message to the server, wherein said first message comprises the public key of the pair and wherein said first message is automatically initiated via a wireless channel;
   wherein the public key is used by the server to: generate a session key, encrypt the set of access codes with the session key to produce a session key encrypted set, and encrypt the session key with the public key to produce an encrypted session key,
   at the tool kit:
   receiving a message from the server containing the session key encrypted set and the encrypted session key;
   receiving the encrypted session key;
   decrypting the encrypted session key with the private key of the pair to recover the session key,
   decrypting the session key encrypted set with the recovered session key to recover the set, and
   storing the decrypted set in the tool kit for use by a user of the user device.

12. An apparatus comprising:
   wireless capability for enabling wireless communication with a server;
   an input/output system; and
   a tool kit operably coupled with the apparatus, said tool kit comprising:
   a memory storing an encryption key; and
   a processor device operatively coupled with the storage, said processor device configured to perform steps of:
   tracking the access code usage of the user device;
   each time the user devices uses an access code, performing:
   comparing a number of unused access codes to a predetermined threshold level;
   responsive to the number of unused access codes reaching the predetermined threshold, automatically generating a first message to the server requesting a new set of access codes without any intervening transmission from the user device;
   wherein the first message is automatically initiated via a wireless channel;
   including in the first message an identification code associated with an encryption key stored in the tool kit, said identification code used by the server to retrieve the encryption key associated with the user device; and
   sending the first message to the server;
   receiving a second message from the server, said second message containing the new set of access codes encrypted with the retrieved encryption key;
   decrypting the new set of access codes with the encryption key from the memory; and
   storing the new set of access codes in the storage.

13. The apparatus of claim 12 wherein receiving the second message further comprises receiving a new encryption key encrypted with the encryption key; and
   wherein the processor device is further configured to perform:
   decrypting the new encryption key using the encryption key; and
   replacing the encryption key with the new encryption key.

14. An apparatus comprising:
   an input/output system;
   a wireless capability for facilitating wireless communication with a server;
   a tool kit comprising:
   a storage; and
   a processor device operatively coupled with the storage, said processor device configured to perform steps of:
   tracking the access code usage of the user device;
   each time the user device uses an access code:
   comparing a number of unused access codes to a predetermined threshold level;
   responsive to the number of unused access codes reaching the predetermined threshold:
   generating a public/private key pair;
   automatically generating a first message to the server requesting a new set of access codes, without any intervening transmission from the user device;

wherein said first message comprises the public key of the pair;

wherein the public key is used by the server to generate a session key, encrypt the set of access codes with the session key to produce a session key encrypted set, encrypt the session key with the public key to produce an encrypted session key, and sending the first message to the server over a wireless communication channel;

receiving a message from the server containing the session key encrypted set and the encrypted session key;

decrypting the encrypted session key with the private key of the pair to recover the session key, decrypting the session key encrypted set with the recovered session key to recover the set, and storing the decrypted set in storage.

* * * * *